United States Patent [19]

Bouchard et al.

[11] Patent Number: 4,560,357
[45] Date of Patent: Dec. 24, 1985

[54] METHOD FOR SEALING ARC DISCHARGE LAMPS

[75] Inventors: Andre C. Bouchard, Peabody; Mark W. Grossman, Belmont, both of Mass.

[73] Assignee: GTE Products Corporation, Stamford, Conn.

[21] Appl. No.: 621,341

[22] Filed: Jun. 18, 1984

[51] Int. Cl.⁴ .......................... H01J 9/24; H01J 9/395
[52] U.S. Cl. ........................................ 445/26; 65/34; 445/43
[58] Field of Search ...................... 445/26, 27, 43, 44; 65/34

[56] References Cited

U.S. PATENT DOCUMENTS 2,561,838  7/1951  Bechard ................................. 65/34
3,551,725 12/1970  Brundige ............................. 313/318
4,508,514  4/1985  English ............................... 445/26

Primary Examiner—Kenneth J. Ramsey
Attorney, Agent, or Firm—William H. McNeill; Carlo S. Bessone

[57] ABSTRACT

A compact fluorescent lamp employs an inner exhaust tubulation formed from glass. The exhaust tubulation is non-invasively sealed after an outer lamp envelope is sealed by directing upon the exhaust tubulation an amount of focused, coherent radiation sufficient to heat the tubulation to its softening point. The outer envelope is transparent to the given radiation.

4 Claims, 4 Drawing Figures

METHOD FOR SEALING ARC DISCHARGE LAMPS

CROSS-REFERENCE TO RELATED APPLICATIONS

U.S. patent application Ser. No. 615,622, filed May 31, 1984 contains subject matter related to the instant invention.

TECHNICAL FIELD

This invention relates to arc discharge lamps and more particularly to fluorescent lamps. Still more particularly, the invention relates to a method for achieving arc tight seals within a previously sealed envelope.

BACKGROUND ART

While the invention has wide application, its use will be described relative to compact fluorescent lamps.

The fluorescent lamp is the most widely utilized light source in the world for general illumination, primarily because of its relatively low initial cost and its efficacy: i.e., its light output relative to its power input, usually expressed as lumens per watt (LPW). Nevertheless, for home use, the fluorescent lamps has not taken precedence over the incandescent lamp. Many reasons have been advanced for this lack of acceptance, among them the poor color rendition of some fluorescent lamps and their need for a ballast. However, one of the major disadvantages lies in the fact that a fluorescent lamp is a linear light source whereas an incandescent lamp can almost be considered a point source. The typical flourescent lamp has a length of from 18" to 8' and is somewhat cumbersome to work with.

With the increasing cost of energy, attempts have been made to overcome the latter difficulty. One of these attempts has utilized a plurality of fluorescent tubes having one or more smaller tubes connecting the ends of the fluorescent tubes to provide an arc path. Such lamps are shown in U.S. Pat. No. 3,501,662. Large, "U" shaped lamps such as those shown in U.S. Pat. Nos. 3,602,755; and 2,401,228; and triple bend lamps such as shown in U.S. Pat. No. 4,347,460 exemplify other attempts.

Still other attempts are shown in U.S. Pat. Nos. 4,208,618; 4,191,907; and Ser. No. 431,955, filed Sept. 30, 1982, now U.S. Pat. No. 4,524,301 assigned to the assignee of the instant invention.

While each of these proposals has its own advantages, disadvantages also exist. The previous forms of multiple tubing lamps are expensive to produce and difficult to handle during manufacture.

Many types require expensive, custom made partitions and/or require large numbers of hermetic seals. Multiple bend tubes require large outlays for manufacturing equipment which adds to the cost of the final lamp.

Recently developed compact fluorescent lamps such as disclosed in U.S. Ser. No. 481,230, filed Apr. 1, 1983, and now U.S. Pat. No. 4,527,089 assigned to the assignee of the instant application, solved many of the above recited disadvantages and the teachings of Ser. No. 481,230 are hereby incorporated herein by reference.

Generally, these lamps comprise an inner lamp assembly mounted within an outer jacket. The inner assembly defines a long arc path in a compact shape and is exposed to an arc generating and sustaining atmosphere contained within the outer jacket. The outer jacket is hermetically sealed but the components of the inner assembly are not. Where necessary, they are fitted in an arc-tight manner but are open to the atmosphere contained within the outer jacket.

To aid in evacuating the inner assembly it has been provided with an exhaust port which can be separately formed in, for example, an arc director. Alternatively, open exhaust tubulations could be employed with the inner assembly.

While this system works well, it has been observed that on occasion the arc will leak from the provided exhaust tubulation and take a path other than that intended.

DISCLOSURE OF THE INVENTION

It is, therefore, an object of this invention to obviate the disadvantages of the prior art.

It is another object of the invention to enhance the operation of compact lamps.

It is yet another object of the invention to provide a method of achieving arc tight seals.

Yet another object of the invention is the provision of an inner assembly exhaust tubulation which can be closed after a lamp is hermetically sealed.

These objects are accomplished, in one aspect of the invention, by the provision of a novel method of making fluorescent lamps. The method comprises forming an inner lamp assembly which includes at least one section of phosphor coated tubing having its ends sealed by sealing flares having an inner exhaust tubulation. The inner lamp assembly is mounted within an envelope formed from glass transparent to given range of radiation. The open end of the envelope is sealed in a manner to leave a second exhaust tubulation. The envelope and the inner assembly are exhausted through the second exhaust tubulation and subsequently filled with an arc generating and sustaining atmosphere which includes mercury, through the second exhaust tubulation. The second exhaust tubulation is then sealed to hermetically close the envelope. Thereafter, focused, coherent, radiation is directed through the envelope to impinge upon the inner exhaust tubulation on the sealing flare of the inner assembly. The radiation is in an amount sufficient to raise the temperature of the inner exhaust tubulation to its softening point.

This non-invasive sealing method at least closes the exhaust tubulation sufficiently to prevent arc leakage therefrom.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
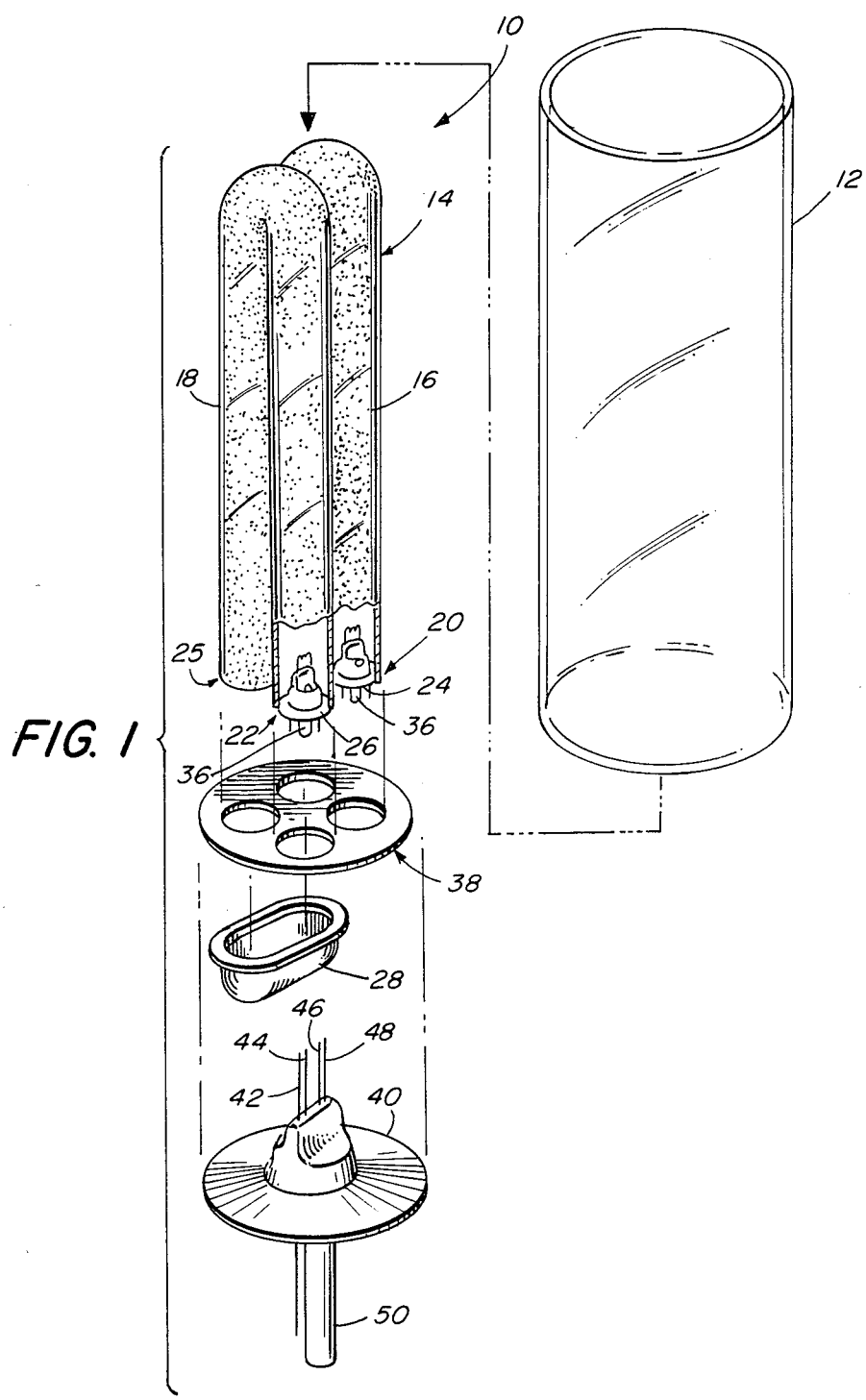
FIG. 1 is an exploded, perspective view of a lamp with which the invention may be employed.

Referring now to the drawings with greater particularity, there is shown in FIG. 1 a compact fluorescent lamp 10 having an outer, light transmissive, glass envelope 12 which is transparent to a given range of electromagnetic radiation and which has mounted therein an inner lamp assembly 14. The inner lamp assembly 14 includes at least one phosphor coated tube. In the illustrated embodiment, two "U" shaped tubes 16 and 18 are employed. The tubes 16 and 18 have ends 20 and 22 which are closed by sealing flares 24 and 26. The other, or open, ends 25 and 27 of the tubes are connected via arc director 28, as taught in U.S. Ser. No. 481,230, filed Apr. 1, 1983, assigned to the assignee of the instant invention, and the teachings of which are herein incorporated by reference.

Sealing flares 24 and 26 (see FIGS. 2 & 3) have sealed therein lead-in wires 30 and 32 having an electrode 34 affixed therebetween. Inner exhaust tubulations 36 are sealed to flares 24 and 26 and project therefrom.

The flares can be a soda-lime glass such as Corning Glass Works type 0081. The "U" shaped tubes 16 and 18 and envelope 12 are preferably of the same material. Type 0081 glass has a softening point ($10^{7.6}$ poises) of 696° C. and a thermal expansion coefficient (0°–300° C.) of $93.5 \times 10^{-7}$/°C.

The lamp 10 is made by forming the inner assembly 14 which, in this instance, comprises the phosphor coated "U" tubes 16 and 18 having their ends 20 and 22 sealed with the sealing flares 24 and 26. The tubes are suitably mounted on a mounting plate 38 which also carries the arc director 28.

Figure 2:
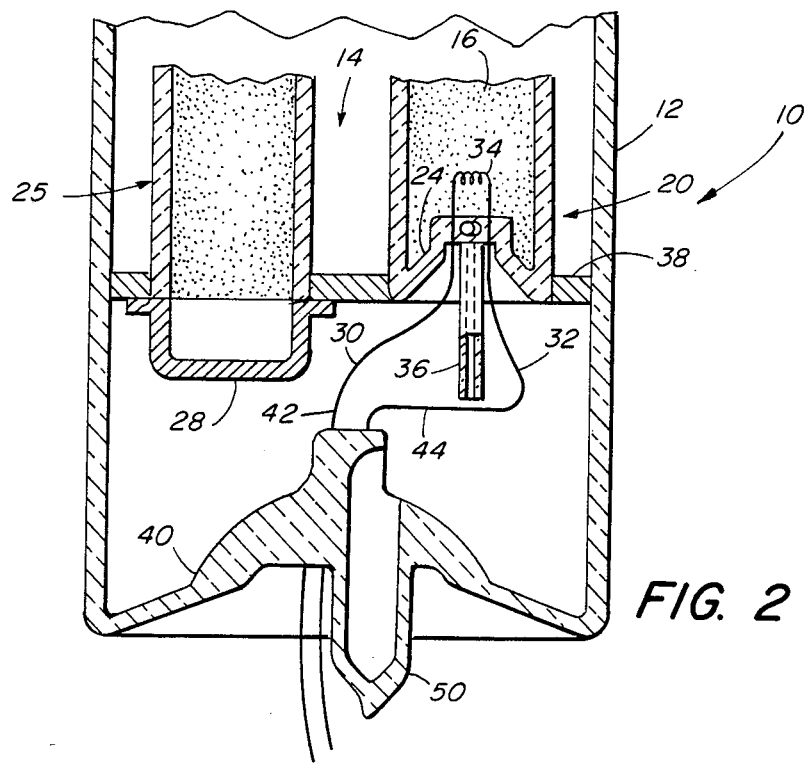
FIG. 2 is a partial, elevational, sectional view of the lamp of FIG. 1.
Figure 3:
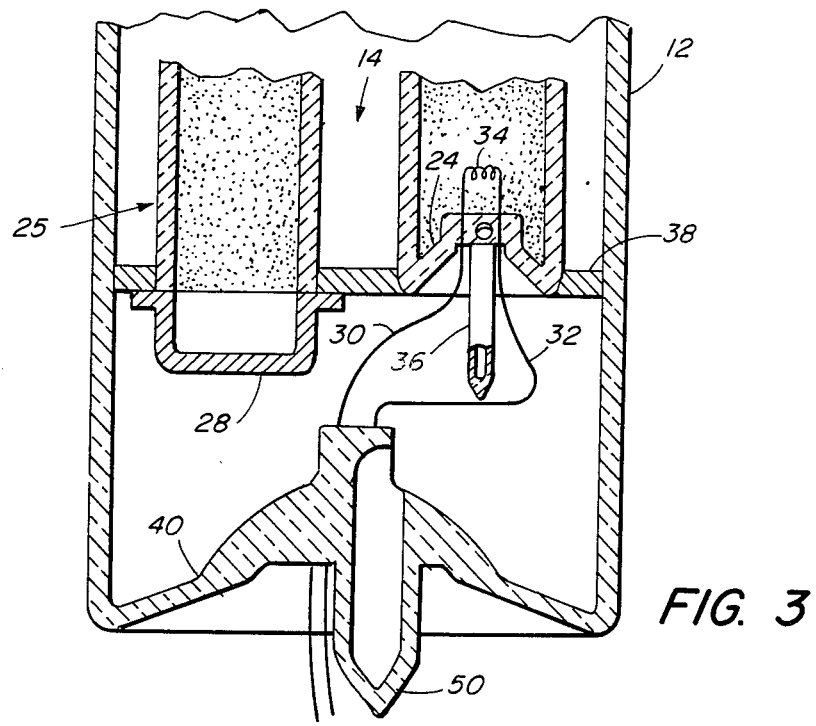
FIG. 3 is a view similar to FIG. 2 after closure.

The inner assembly 14 is then mounted upon a second sealing flare 40 which has sealed therein lead-in wires 42, 44, 46 and 48 for connection to the lead-ins of tubes 16 and 18. For clarity, only the lead-ins 42 and 44 are shown in FIGS. 2 and 3. Sealing flare 40 carries a second exhaust tubulation 50.

The inner assembly 14 is then inserted into envelope 12 and sealing flare 40 is sealed thereto by conventional means. Envelope 12 is then exhausted and filled with an arc generating and sustaining medium, e.g., about 20 mg of mercury and argon at a pressure of 3 torr, and exhaust tubulation 50 is sealed.

Lamp 10 is now in an operable condition since the arc generating and sustaining medium contained within envelope 12 penetrates the tubes 16 and 18 which are not individually hermetically sealed.

Experience has shown, however, that occasionally an arc will not follow its programmmed path through the tubes and arc director from one electrode to another; but will "leak" out through the open exhaust tubulations 36 in flares 24 and 26.

This problem is eliminated by the novel method employed and the steps below.

The exhaust tubulations 36 are closed by directing focused, coherent radiation upon them. The radiation passes through the transmissive glass of envelope 12 and is focused on and absorbed by the tubulations 36; raising the temperature thereof to the softening point and causing the tubulation to close, as is shown in FIG. 3. It is to be noted that complete closure is not necessary, since a hermetic seal is not being formed. It is sufficient only to close the tubulation enough to prevent the arc from leaking.

Figure 4:
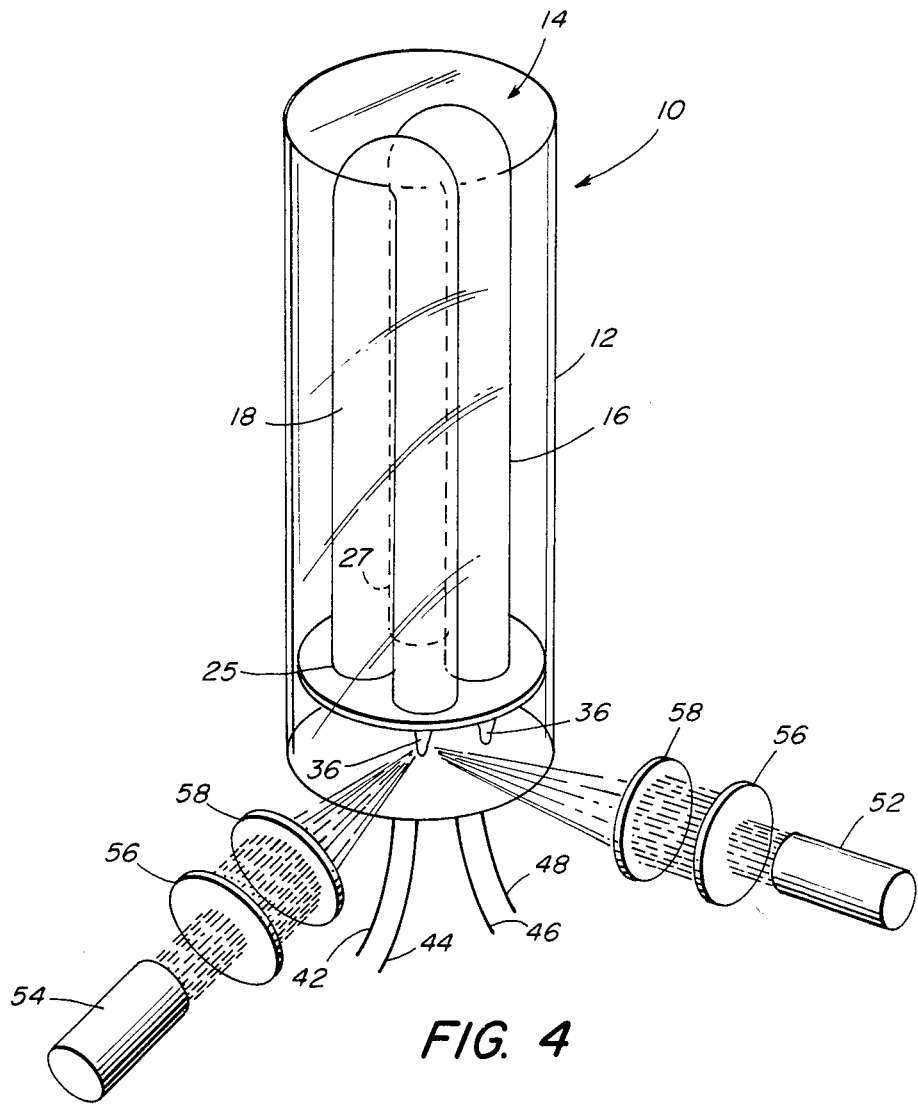
FIG. 4 is a diagrammatic, sectional view of a method of closure.

The procedure for this non-invasive sealing technique is illustrated in FIG. 4. While any number of radiation sources may be employed, a preferred embodiment uses two ruby lasers 52 and 54 having associated therewith an optical system employing expanding lens 56 and focussing lens 58. With such lasers and optics the tubulations can be closed in 12 to 15 seconds.

Other lasers can be employed, so long as the inner glass to be sealed will absorb radiation which can be passed through the outer envelope.

There is thus provided a compact fluorescent lamp having enhanced operation achieved through the use of a novel, non-invasive sealing technique.

While there has been shown what are at present considered to be the preferred embodiments of the invention, it will be apparent to those skilled in the art that various changes and modifications can be made herein without departing from the scope of the invention as defined by the appended claims.

We claim:

1. In the method of making a fluorescent lamp the steps comprising: forming an inner lamp assembly including at least one section of phosphor coated tubing, said tubing having its ends closed by sealing flares mounting electrodes within said tubing, said sealing flares comprising a first glass portion having an inner exhaust tubulation projecting therefrom; mounting said inner lamp assembly within an envelope formed from glass transparent to a given range of radiation; sealing an open end of said envelope while leaving a second exhaust tubulation, exhausting said envelope and inner lamp assembly through said second exhaust tubulation; filling said envelope with an arc generating and sustaining atmosphere including mercury, through said second exhaust tubulation; sealing said second exhaust tubulation to hermetically seal said envelope; and directing focused, coherent radiation through said envelope upon said inner exhaust tubulation, said radiation being in an amount sufficient to raise the temperature of said inner exhaust tubulation to its softening point.

2. The method of claim 1 wherein said inner exhaust tubulation is heated sufficiently to at least substantially close.

3. The method of claim 2 wherein said radiation emanates from two sources.

4. The method of claim 3 wherein said sources comprise ruby lasers.

* * * * *